United States Patent
Chen et al.

(10) Patent No.: US 12,210,551 B2
(45) Date of Patent: Jan. 28, 2025

(54) DIALOGUE GENERATION METHOD AND NETWORK TRAINING METHOD AND APPARATUS, STORAGE MEDIUM, AND DEVICE

(71) Applicant: TENCENT TECHNOLOGY (SHENZHEN) COMPANY LIMITED, Guangdong (CN)

(72) Inventors: Xiuyi Chen, Shenzhen (CN); Fandong Meng, Shenzhen (CN); Peng Li, Shenzhen (CN); Jie Zhou, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 321 days.

(21) Appl. No.: 17/939,440

(22) Filed: Sep. 7, 2022

(65) Prior Publication Data
US 2023/0028944 A1    Jan. 26, 2023

Related U.S. Application Data

(63) Continuation of application No. PCT/CN2021/109736, filed on Jul. 30, 2021.

(30) Foreign Application Priority Data

Aug. 14, 2020 (CN) .......................... 202010816286.6

(51) Int. Cl.
*G06N 5/022* (2023.01)
*G06F 16/33* (2019.01)
(Continued)

(52) U.S. Cl.
CPC ...... *G06F 16/3347* (2019.01); *G06F 16/3329* (2019.01); *G06F 18/2321* (2023.01); *G06N 5/022* (2013.01)

(58) Field of Classification Search
CPC .. G06F 16/3347; G06F 16/3329; G06N 5/022
(Continued)

(56) References Cited

U.S. PATENT DOCUMENTS

2020/0226475 A1    7/2020    Ma et al.

FOREIGN PATENT DOCUMENTS

| CN | 108363690 A | 8/2018 |
|---|---|---|
| CN | 109582767 A | 4/2019 |

(Continued)

OTHER PUBLICATIONS

International Search Report for PCT/CN2021/109736 dated Nov. 1, 2021 [PCT/ISA/210].
(Continued)

*Primary Examiner* — George C Monikang
(74) *Attorney, Agent, or Firm* — Sughrue Mion, PLLC

(57) ABSTRACT

A dialogue generation method, a network training method and apparatus, a storage medium, and a device are provided. The method includes: predicting, based on a plurality of a plurality of pieces of candidate knowledge text in a first candidate knowledge set, a preliminary dialogue response of a first dialogue preceding text; processing the first dialogue preceding text based on the preliminary dialogue response to obtain a first dialogue preceding text vector; obtaining a piece of target knowledge text based on a probability value of the piece of target knowledge text of being selected to be used in generating a final dialogue response, the probability value being obtained based on the first dialogue preceding text vector; and generating the final dialogue response based on the first dialogue preceding text and the piece of target knowledge text.

20 Claims, 7 Drawing Sheets

(51) Int. Cl.
*G06F 16/332* (2019.01)
*G06F 18/2321* (2023.01)

(58) Field of Classification Search
USPC .......................................... 704/231, 240, 251
See application file for complete search history.

(56) References Cited

FOREIGN PATENT DOCUMENTS

| | | | |
|---|---|---|---|
| CN | 110222155 | A | 9/2019 |
| CN | 110245222 | A | 9/2019 |
| CN | 110704703 | A | 1/2020 |
| CN | 111897941 | A | 11/2020 |

OTHER PUBLICATIONS

Written Opinion for PCT/CN2021/109736 dated Nov. 1, 2021 [PCT/ISA/237].

DIALOGUE GENERATION METHOD AND NETWORK TRAINING METHOD AND APPARATUS, STORAGE MEDIUM, AND DEVICE

CROSS-REFERENCE TO RELATED APPLICATION(S)

This application is a continuation application of International Application No. PCT/CN2021/109736, filed Jul. 30, 2021, which claims priority to Chinese Patent Application No. 202010816286.6, filed on Aug. 14, 2020, with the China National Intellectual Property Administration, the disclosures of which are incorporated by reference in their entireties.

FIELD

The disclosure relates to the field of artificial intelligence (AI), and in particular, to a dialogue generation method and a network training method and apparatus, a storage medium, and a device.

BACKGROUND

Human-machine dialogue is a typical natural language processing (NLP) task in the field of artificial intelligence (AI), and currently has wide application prospects.

Generally, the human-machine dialogue is implemented based on an intelligent dialogue robot (also referred to as an intelligent dialogue system or an intelligent dialogue platform). In some embodiments, based on the AI technology, the intelligent dialogue robot can provide a user with services such as information query, emotional chat, knowledge-grounded question answering, task dialogue, or the like.

Whether the intelligent dialogue robot can output an accurate dialogue response to the user is a key factor affecting the quality of the human-machine dialogue. To this end, how to generate the high-quality dialogue response in a process of human-machine interaction has become an urgent problem to be solved.

SUMMARY

Embodiments of the disclosure provide a dialogue generation method and a network training method and apparatus, a storage medium, and a device, which may significantly improve the quality of human-machine dialogue.

According to one aspect, a dialogue generation method is provided, including:
predicting, based on a first dialogue preceding text and a plurality of pieces of candidate knowledge text in a first candidate knowledge set, a preliminary dialogue response of the first dialogue preceding text, where each piece of the candidate knowledge text is associated with the first dialogue preceding text in content;
processing the first dialogue preceding text based on the preliminary dialogue response to obtain a first dialogue preceding text vector;
obtaining a piece of target knowledge text from the first candidate knowledge set based on a probability value of the piece of target knowledge text of being selected to be used in generating a final dialogue response, the probability value being obtained based on the first dialogue preceding text vector; and
generating a final dialogue response of the first dialogue preceding text based on the first dialogue preceding text and the piece of target knowledge text.

According to another aspect, a network training method is provided, including:
predicting, based on a second dialogue preceding text and a plurality of pieces of candidate knowledge text in a second candidate knowledge set, a preliminary dialogue response of the second dialogue preceding text, where each piece of the candidate knowledge text is associated with the second dialogue preceding text in content;
processing the second dialogue preceding text based on the preliminary dialogue response to obtain a second dialogue preceding text vector;
training a knowledge selection network based on a fourth probability distribution and a fifth probability distribution, where the knowledge selection network is responsible for outputting a piece of target knowledge text for dialogue generation, where
the fourth probability distribution refers to a probability value of selecting each piece of the candidate knowledge text that is obtained based on the second dialogue preceding text vector that is used as a condition;
the fifth probability distribution refers to the probability value of each piece of the candidate knowledge text that is obtained based on the second dialogue preceding text vector and a historical dialogue response that are used as conditions; and matching the historical dialogue response with the second dialogue preceding text.

According to another aspect, a dialogue generation apparatus is provided, including:
a prediction module, configured to predict, based on a first dialogue preceding text and a plurality of pieces of candidate knowledge text in a first candidate knowledge set, a preliminary dialogue response of the first dialogue preceding text, wherein each piece of the candidate knowledge text is associated with the first dialogue preceding text in content;
a screening module, configured to process the first dialogue preceding text based on the preliminary dialogue response to obtain a first dialogue preceding text vector; and obtaining a piece of target knowledge text from the first candidate knowledge set based on a probability value of the piece of target knowledge text of being selected to be used in generating a final dialogue response, the probability value being obtained based on the first dialogue preceding text vector; and
a generation module, configured to generate a final dialogue response of the first dialogue preceding text based on the first dialogue preceding text and the piece of target knowledge text.

According to another aspect, a network training apparatus is provided, including:
an update module, configured to predict, based on a second dialogue preceding text and a plurality of pieces of candidate knowledge text in a second candidate knowledge set, a preliminary dialogue response of the second dialogue preceding text, wherein each piece of the candidate knowledge text is associated with the second dialogue preceding text in content; processing the second dialogue preceding text based on the preliminary dialogue response to obtain a second dialogue preceding text vector;
a first training module, configured to train a knowledge selection network based on a fourth probability distribution and a fifth probability distribution, where the knowledge selection network is responsible for outputting a piece of target knowledge text for dialogue generation, where the fourth probability distribution refers to a probability value of each piece of the candidate knowledge text of being selected that is obtained based on the second dialogue preceding text vector that is used as a condition; and the fifth probability distribution refers to the probability value of selecting each piece of the candidate knowledge text that is obtained based on the second dialogue preceding text vector and a historical dialogue response that are used as conditions; and matching the historical dialogue response with the second dialogue preceding text.

According to one aspect, a computer device is provided, including a processor and a memory, the memory storing at least one segment of program code, the at least one piece of program code being loaded and executed by the processor to implement the following operations:

predicting, based on a first dialogue preceding text and a plurality of pieces of candidate knowledge text in a first candidate knowledge set, a preliminary dialogue response of the first dialogue preceding text, where each piece of the candidate knowledge text is associated with the first dialogue preceding text in content;

processing the first dialogue preceding text based on the preliminary dialogue response to obtain a first dialogue preceding text vector;

obtaining a piece of target knowledge text from the first candidate knowledge set based on a probability value of the piece of target knowledge text of being selected to be used in generating a final dialogue response, the probability value being obtained based on the first dialogue preceding text vector; and generating a final dialogue response of the first dialogue preceding text based on the first dialogue preceding text and the piece of target knowledge text.

According to one aspect, a computer device is provided, including a processor and a memory, the memory storing at least one segment of program code, the at least one piece of program code being loaded and executed by the processor to implement the following operations:

predicting, based on a second dialogue preceding text and a plurality of pieces of candidate knowledge text in a second candidate knowledge set, a preliminary dialogue response of the second dialogue preceding text, where each piece of the candidate knowledge text is associated with the second dialogue preceding text in content;

processing the second dialogue preceding text based on the preliminary dialogue response to obtain a second dialogue preceding text vector;

training a knowledge selection network based on a fourth probability distribution and a fifth probability distribution, where the knowledge selection network is responsible for outputting a piece of target knowledge text for dialogue generation, where the fourth probability distribution refers to a probability value of each piece of the candidate knowledge text of being selected that is obtained based on the second dialogue preceding text vector that is used as a condition; and the fifth probability distribution refers to the probability value of selecting each piece of the candidate knowledge text that is obtained based on the second dialogue preceding text vector and a historical dialogue response that are used as conditions; and matching the historical dialogue response with the second dialogue preceding text.

According to another aspect, a storage medium is provided, storing at least one piece of program code, the at least one piece of program code being loaded and executed by a processor to implement the following operations:

predicting, based on a first dialogue preceding text and a plurality of pieces of candidate knowledge text in a first candidate knowledge set, a preliminary dialogue response of the first dialogue preceding text, wherein each piece of the candidate knowledge text is associated with the first dialogue preceding text in content;

processing the first dialogue preceding text based on the preliminary dialogue response to obtain a first dialogue preceding text vector;

obtaining a piece of target knowledge text from the first candidate knowledge set based on a probability value of the piece of target knowledge text, the probability value being obtained based on the first dialogue preceding text vector; and generating a final dialogue response of the first dialogue preceding text based on the first dialogue preceding text and the piece of target knowledge text.

According to another aspect, a storage medium is provided, storing at least one piece of program code, the at least one piece of program code being loaded and executed by a processor to implement the following operations:

predicting, based on a second dialogue preceding text and a plurality of pieces of candidate knowledge text in a second candidate knowledge set, a preliminary dialogue response of the second dialogue preceding text, wherein each piece of the candidate knowledge text is associated with the second dialogue preceding text in content;

processing the second dialogue preceding text based on the preliminary dialogue response to obtain a second dialogue preceding text vector;

training a knowledge selection network based on a fourth probability distribution and a fifth probability distribution, where the knowledge selection network is responsible for outputting a piece of target knowledge text for dialogue generation, where the fourth probability distribution refers to a probability value of each piece of the candidate knowledge text of being selected, the probability value being obtained based on the second dialogue preceding text vector that is used as a condition; and the fifth probability distribution refers to the probability value of each piece of the candidate knowledge text of being selected, the probability value being obtained based on the second dialogue preceding text vector and a historical dialogue response that are used as conditions; and matching the historical dialogue response with the second dialogue preceding text.

According to another aspect, a computer program product or a computer program is provided, the computer program product or the computer program including computer program code, the computer program code being stored in a computer-readable storage medium, a processor of a computer device reading the computer program code from the computer-readable storage medium, and the processor executing the computer program code to cause the computer device to implement the following operations:

predicting, based on a first dialogue preceding text and a plurality of pieces of candidate knowledge text in a first candidate knowledge set, a preliminary dialogue response of the first dialogue preceding text, where each piece of the candidate knowledge text is associated with the first dialogue preceding text in content;

processing the first dialogue preceding text based on the preliminary dialogue response to obtain a first dialogue preceding text vector;

obtaining a piece of target knowledge text from the first candidate knowledge set based on a probability value of the piece of target knowledge text, the probability value being obtained based on the first dialogue preceding text vector; and generating a final dialogue response of the first dialogue preceding text based on the first dialogue preceding text and the piece of target knowledge text.

According to another aspect, a computer program product or a computer program is provided, the computer program product or the computer program including computer program code, the computer program code being stored in a computer-readable storage medium, a processor of a computer device reading the computer program code from the computer-readable storage medium, and the processor executing the computer program code to cause the computer device to implement the following operations:

predicting, based on a second dialogue preceding text and a plurality of pieces of candidate knowledge text in a second candidate knowledge set, a preliminary dialogue response of the second dialogue preceding text, wherein each piece of the candidate knowledge text is associated with the second dialogue preceding text in content;

processing the second dialogue preceding text based on the preliminary dialogue response to obtain a second dialogue preceding text vector;

training a knowledge selection network based on a fourth probability distribution and a fifth probability distribution, where the knowledge selection network is responsible for outputting a piece of target knowledge text for dialogue generation, where the fourth probability distribution refers to a probability value of each piece of the candidate knowledge text of being selected, the probability being obtained based on the second dialogue preceding text vector that is used as a condition; and the fifth probability distribution refers to the probability value of each piece of the candidate knowledge text of being selected, the probability being obtained based on the second dialogue preceding text vector and a historical dialogue response that are used as conditions; and matching the historical dialogue response with the second dialogue preceding text.

BRIEF DESCRIPTION OF THE DRAWINGS

To describe the technical solutions in the embodiments of the disclosure more clearly, the following briefly introduces the accompanying drawings required for describing the embodiments. Apparently, the accompanying drawings in the following description show only some embodiments of the disclosure, and a person of ordinary skill in the art may still derive other accompanying drawings from the accompanying drawings without creative efforts.

DESCRIPTION

Figure 1:
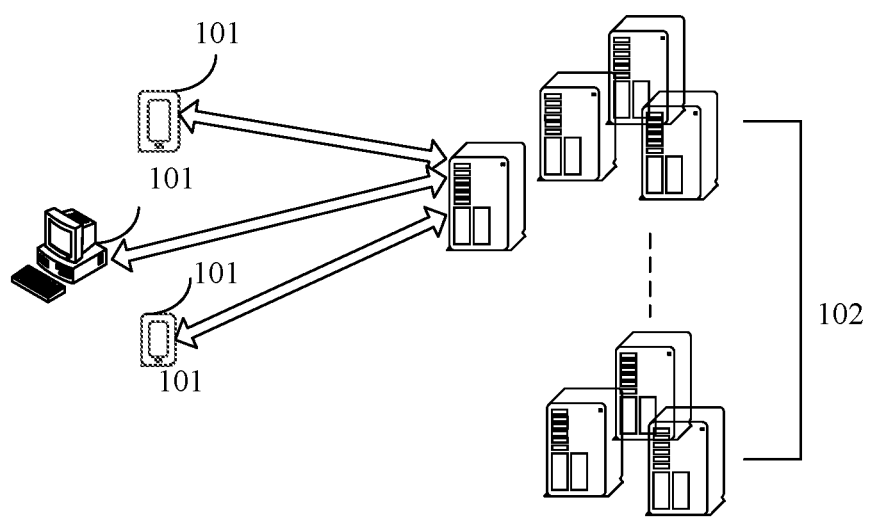
FIG. 1 is a schematic diagram of an implementation environment of a dialogue generation method and a network training method according to an embodiment of the disclosure.

To make the objectives, technical solutions, and advantages of the disclosure clearer, the following further describes implementations of the disclosure in detail with reference to the accompanying drawings.

It may be understood that the terms "first", "second", and the like used in the disclosure may be used for describing various concepts in this specification. However, the concepts are not limited by the terms unless otherwise specified. The terms are merely used for distinguishing one concept from another concept. "At least one" refers to "one or more". For example, "at least one user" may refer to any integral number of users, the integral number being greater than or equal to one, for example, one user, two users, or three users. "A plurality of" refers to "two or more". For example, "a plurality of users" may refer to any integral number of users, the integral number being greater than or equal to two, for example, two users or three users.

Embodiments of the disclosure provide a dialogue generation method and a network training method and apparatus, a storage medium, and a device. The method relates to artificial intelligence (AI) technology.

The solutions provided in this embodiment of the disclosure relate to technologies such as natural language processing and deep learning of AI, which are described by using the following embodiments.

Next, some key terms or abbreviations involved in the embodiments of the disclosure are introduced.

An open domain dialogue is a concept opposite to a closed domain dialogue. The open domain dialogue refers to a dialogue in which a person may communicate with an intelligent dialogue robot on an equal footing. Generally, in an open domain dialogue system, content of a dialogue is not limited, and a topic may be an arbitrary one. In other words, a dialogue without explicit intention of the user may be considered the open domain dialogue. The closed domain dialogue refers to a dialogue that is performed to clarify an objective of the user (or referred to as task details) after identifying the intention of the user.

A knowledge-grounded dialogue: The task aims to generate informative responses by introducing external knowledge.

In the absence of necessary external knowledge, although a dialogue response outputted by the intelligent dialogue robot may be appropriate, less information may be included. That is, the generated dialogue responses are typically all generic, short, and less informative, such as "I don't know" and "That's good". More appropriate and informative dialogue responses may be generated in the knowledge-grounded dialogue by introducing the external knowledge.

External knowledge refers to dialogue-worthy knowledge derived from various fields. The external knowledge is stored in a knowledge base. The various fields include but are not limited to: weather, entertainment interaction, service handling, remote customer service, reception and guidance, medical care, traffic navigation, tourism, industry, or the like. In some embodiments, using the entertainment interaction field as an example, knowledge in the field may be dialogue-worthy knowledge derived from movies and entertainment programs, such as box office, actors, directors, evaluations, or the like, which are not specifically limited in this embodiment of the disclosure.

Prior information: Information that people know about a to-be-estimated unknown parameter before a sample is drawn may be referred to as prior information.

That is, for subsequent tasks, the prior information refers to currently known information. For example, during generating a dialogue response, the known dialogue history is the prior information, and past experience of an individual is the prior information.

Prior distribution: Information about an unknown parameter x is represented by a distribution form p(x), and the distribution p(x) is referred to as a prior distribution of the unknown parameter x.

That is, the prior distribution is a decision distribution of a specific thing/event based on the prior information; and for example, given the cloudy day today, and past experience with the weather (it may rain on cloudy days and it is normally cool on cloudy days), the prior distribution is a probability distribution of deciding to go out for an outing, stay at home, or go to the gym.

For example, in measuring a gravitational acceleration of a place, it is known before the measurement that the gravitational acceleration of the place is around 9.8 according to the order of nature. This is the information obtained according to the order of nature. Then, according to the order of nature, it is known that a difference between the gravitational acceleration of any place and the standard gravitational acceleration does not exceed 0.1, which is the prior distribution.

Posterior information: Information that is obtained after a current moment (or a current time). In this embodiment of the disclosure, the posterior information refers to dialogue responses during dialogue.

In some embodiments, in an actual human-machine dialogue process, the posterior information may refer to: a dialogue response outputted by the intelligent dialogue robot for a dialogue question initiated by the user. For example, a friend A has a stomachache, and a friend B tells the friend A "drink more hot water", which may cause the friend A to quarrel with the friend B. When the friend B says "drink more hot water", the friend B does not know a reaction of the friend A, which is the posterior information.

Posterior distribution: Before a sample is drawn, people have an understanding of unknown parameters, that is, a distribution. After the sample is drawn, because the sample includes information about the unknown parameters, information about the unknown parameters may help people to correct information before sampling. Continuing from the previous example, if the friend B knew the posterior information that the friend A was going to quarrel with the friend B, the friend B would not say "drink more hot water".

In other words, a result of an event is known, and then a reason is inferred based on the result of the event. That is, the probability distribution that the result of the event is caused by a specific reason is the posterior distribution. That is, a result of an event is known in advance (such as time spent on the road), and then the probability distribution of a reason (such as a mode of transportation) being estimated according to the result of the event is the posterior distribution.

Prior knowledge selection: Given a dialogue preceding text and an external knowledge base, a plurality of different pieces of suitable knowledge may be selected from the external knowledge base based on the dialogue preceding text. The process is prior knowledge selection. For the dialogue preceding text, although there are a plurality of pieces of suitable knowledge, some knowledge that is not suitable for the dialogue response in the database may not be selected.

Posterior knowledge selection: Given dialogue corpora (including a dialogue preceding text and a dialogue response), suitable knowledge is selected from the external knowledge base based on the dialogue corpora. The process is posterior knowledge selection. An actual range of knowledge used in the posterior knowledge selection is narrower than that used in the prior knowledge selection. That is, which piece of knowledge is used is inferred according to the dialogue preceding text and the dialogue response. Because a selection range of the posterior knowledge selection is narrow, it is easier to select knowledge in the posterior knowledge selection.

Copy mechanism: A specific segment is located in an input sequence, and the segment is directly copied into the output sequence. The copy mechanism is often used in natural language processing and a dialogue system. The copy mechanism may ensure the integrity of information and accelerate convergence of a model.

Prior query: During knowledge selection, knowledge selection is performed only with the dialogue preceding text and the knowledge base as a premise, which is referred to as prior query.

Posterior query: During knowledge selection, knowledge selection is performed with the dialogue preceding text, the dialogue response, and the knowledge base as a premise, which is referred to as posterior query.

An implementation environment of a dialogue generation and network training solution provided in example embodiments of the disclosure is described below.

The dialogue generation method provided in the example embodiments of the disclosure may be applied to an intelligent dialogue robot (also referred to as an intelligent dialogue system or an intelligent dialogue platform). The intelligent dialogue bot may be represented as a server.

In some embodiments, referring to FIG. 1, the implementation environment includes: a terminal 101 and an intelligent dialogue robot 102.

In some embodiments, the intelligent dialogue robot 102 may be an independent physical server, or may be a server cluster or a distributed system formed by a plurality of physical servers, or may be a cloud server that provides a basic cloud computing service such as a cloud service, a cloud database, cloud computing, a cloud function, cloud storage, a network service, cloud communication, a middleware service, a domain name service, a security service, a content delivery network (CDN), big data, and an artificial intelligence platform.

The terminal 101 may be a smartphone, a tablet computer, a notebook computer, a desktop computer, a smart speaker, a smart watch, or the like, but is not limited thereto. The terminal 101 and the intelligent dialogue robot 102 may be directly or indirectly connected in a wired or wireless communication manner, which is not limited in the disclosure.

In some embodiments, application scenarios of the dialogue generation method provided in the embodiments of the disclosure include but are not limited to:

Scenario 1. Task Scenario

A task-based dialogue is used for completing a specific task. For example, booking an air ticket requires not only answering the user, but also querying an air ticket status and performing a corresponding action. That is, the task-based dialogue has a task objective, and needs to parameterize a user request. It is assumed that the dialogue preceding text of the user is "Book an air ticket from a city A to a city B tomorrow for me". Intention: Book an air ticket; Slot: Time, origin, and destination. Therefore, parametric expression may be: Book an air ticket from [origin] to [destination] at [time] for me.

Scenario 2. Question Answering Scenario

Question answering dialogue is mainly used for answering questions asked by the user, which is equivalent to an encyclopedic knowledge base, such as how to refund a train ticket and what to pay attention to when taking a plane. Generally, only questions need to be answered and there is no need to perform a task. That is, the question answering dialogue has a task objective, but does not need to parameterize a request. For example, in response to the dialogue preceding text of the user "How to handle refunding of a train ticket", the intelligent dialogue robot may only need to retrieve knowledge most similar to the sentence from the knowledge base, then generate a dialogue response according to the retrieved knowledge, and provide the generated dialogue response as an answer to the user.

Scenario 3. Chatting Scenario

Chatting dialogue is open-ended, often with no task objectives and no hard-and-fast answers. The chatting dialogue may include various aspects, such as emotional chat between the user and the robot, which is not specifically limited in this embodiment of the disclosure.

Figure 2:
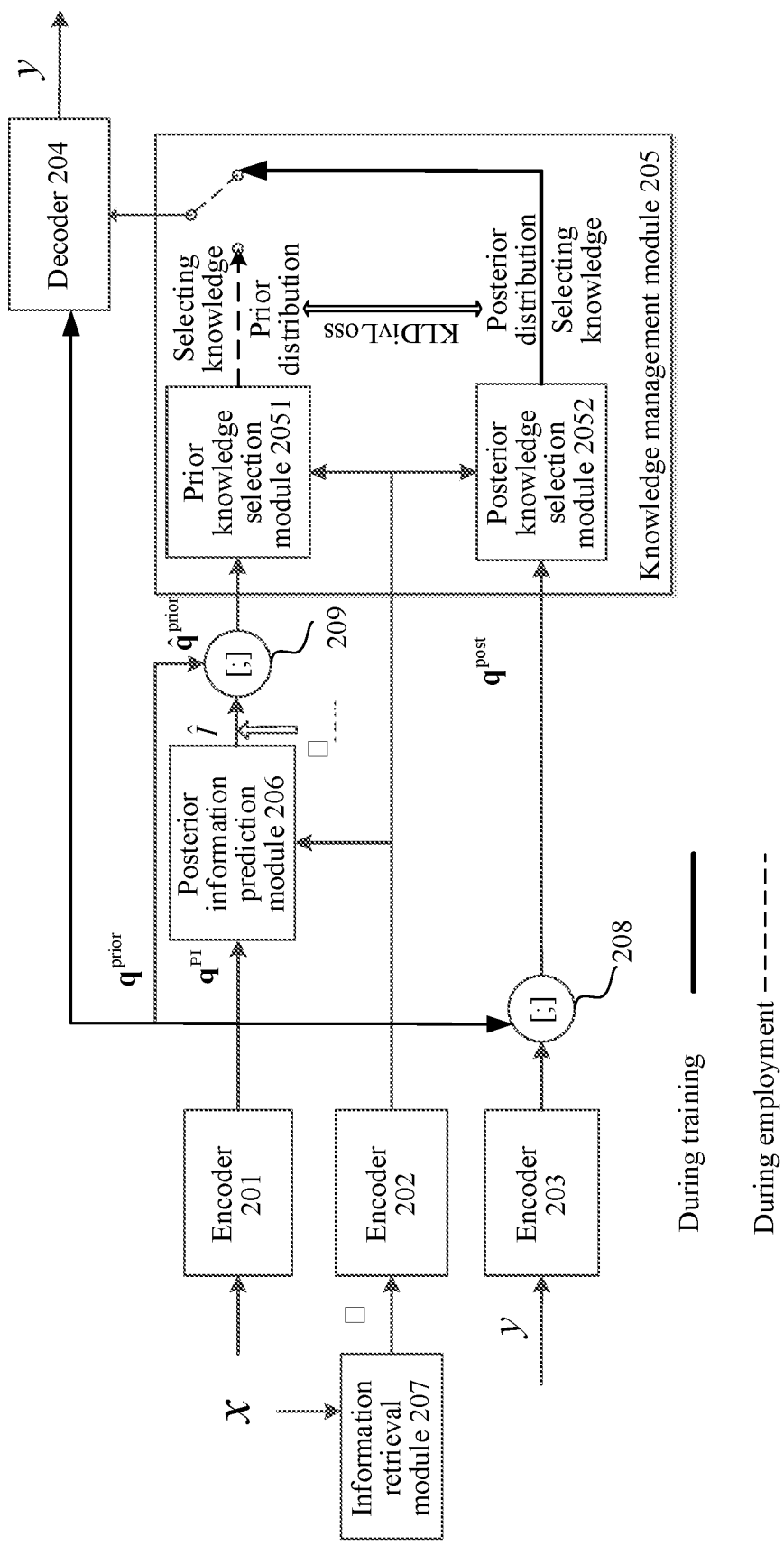
FIG. 2 is a schematic diagram of a knowledge-grounded dialogue framework according to an embodiment of the disclosure.

FIG. 2 is a schematic diagram of a knowledge-grounded dialogue framework according to an embodiment of the disclosure.

In this embodiment of the disclosure, referring to FIG. 2, the dialogue frame includes: an encoder 201, an encoder 202, an encoder 203, a decoder 204, a knowledge management module 205, a posterior information prediction module 206, an information retrieval module 207, a first feature splicing module 208, and a second feature splicing module 209. The knowledge management module 205 further includes a prior knowledge selection module 2051 and a posterior knowledge selection module 2052.

Encoder 201, Encoder 202, and Encoder 203

The encoder 201 is also referred to as a speech encoder, and the encoder 202 is also referred to as a knowledge encoder.

As shown in FIG. 2, given a source speech x (also referred to as a dialogue preceding text x), the source speech x is encoded by the encoder 201. In a training stage, output data of the encoder 201 may be inputted to the decoder 204, the posterior information prediction module 206, and the first feature splicing module 208.

Content that is inputted by the encoder 201 to the decoder 204 is a matrix representation of x, and content that is inputted by the encoder 201 to the posterior information prediction module 206 and the first feature splicing module 208 is a vector representation of x.

In addition, after the source speech x is inputted to the information retrieval module 207, the information retrieval module 207 outputs L pieces of candidate knowledge $\mathcal{K} = \{k^1, \ldots, k^L\}$. Then, each piece of the candidate knowledge $k^1 \in \mathcal{K}$ is encoded by the encoder 202, and output data of the encoder 202 is respectively inputted to the knowledge management module 205 and the posterior information prediction module 206.

In some embodiments, an organizational form of the piece of candidate knowledge may be either unstructured text or structured triples, which are not specifically limited in this embodiment of the disclosure. In addition, because knowledge is generally a text form, the piece of candidate knowledge is also referred to as a piece of candidate knowledge text in this specification. That is, the L pieces of candidate knowledge are also referred to as L pieces of candidate knowledge text, and the L pieces of candidate knowledge form a candidate knowledge set. Values of 1 and L are positive integers, and a value range of 1 is 1 to L.

In the training stage, a dialogue response y corresponding to the source speech x is known. After encoding processing is performed on the dialogue response y by the encoder 203, the output data of this step is inputted to the first feature splicing module 208. After the first feature splicing module 20 performs feature splicing between a feature vector of the dialogue response y and a feature vector of the source speech x, the obtained feature vector is inputted to the posterior knowledge selection module 2052 as posterior query $q^{post}$.

In a deployment stage, because the dialogue response y is unknown, the prior knowledge selection module 2051 selects a piece of appropriate candidate knowledge k from the L pieces of candidate knowledge based on the input data and inputs the piece of appropriate candidate knowledge to the decoder 204; and finally, the decoder 204 generates the dialogue response y based on the source speech x and the selected piece of candidate knowledge k. That is, the dialogue response y in the deployment stage is generated based on the source speech x and a specific piece of candidate knowledge $k \in \mathcal{K}$. The input data of the prior knowledge selection module 2051 includes: the output data of the second feature splicing module 209 and the output data of the encoder 202.

In some embodiments, for the encoder 201, the encoder 202, and the encoder 203, encoding is implemented by using a bidirectional recurrent neural network (RNN) with a gate recurrent unit (GRU). That is, the encoder 201, the encoder 202, and the encoder 203 include two parts: a forward RNN and a backward RNN, which are not specifically limited in this embodiment of the disclosure.

In this embodiment of the disclosure, the output data obtained by the source speech x after passing through the encoder 201 is inputted to the posterior information prediction module 206 for predicting posterior information (that is, a dialogue response). In addition, the output data obtained after the source speech x passes through the encoder 201 is further used as an initial hidden state of the decoder 204.

In some embodiments, the encoder 202 and the encoder 203 may have the same architecture as the encoder 201, but may not share any parameters, nor share parameters when used, which is not specifically limited in this embodiment of the disclosure.

Posterior Information Prediction Module 206

In this embodiment of the disclosure, the posterior information prediction module 206 is a core part. That is, this embodiment of the disclosure provides a knowledge-grounded dialogue method in which the posterior information predicted by the posterior information prediction module 206 is used to enhance the capability of prior knowledge selection.

In short, in the training stage, the posterior information prediction module 206 learns how to predict posterior information; and in the deployment stage, the posterior information prediction module 206 is configured to predict the posterior information (that is, the dialogue response y) for the source speech x, where the predicted posterior information is used for enhancing the capability of prior knowledge selection of the prior knowledge selection module 2051. The solution may implement a better approximation of the posterior distribution by the prior knowledge selection module 2051 during training, and additional posterior information is provided by the posterior information prediction module 206 to help prior knowledge selection during deployment.

That is, in the training stage, the posterior information prediction module 206 learns how to generate meaningful posterior information through the training of a supervisory signal $\mathcal{L}_{PIPM}$ by using the source speech x and the corresponding piece of candidate knowledge; in this way, in the deployment stage, prior query $q^{prior}$ is updated with the posterior information predicted by the posterior information prediction module 206 in an organization manner similar to the posterior query $q^{post}$; and then, the prior knowledge selection module 2051 is caused to perform prior knowledge selection based on the updated prior query $\hat{q}^{prior}$.

Knowledge Management Module 205

In the training stage, both the source speech x and the corresponding dialogue response y are inputted to the knowledge management module 205. Therefore, the posterior knowledge selection module 2052 obtains a conditional probability distribution $p(k|q^{post})$ on the candidate knowledge set, and samples the piece of candidate knowledge by using the conditional probability distribution. Because the conditional probability distribution uses the source speech x and the dialogue response y as conditions, in this step, knowledge used in the dialogue response outputted by a dialogue frame is actually captured through the posterior distribution.

In the deployment stage, the dialogue response y does not exist, so the posterior distribution cannot be used for capturing knowledge in the candidate knowledge set, and further the desired posterior distribution $p(k|q^{post})$ needs to be estimated by using the prior distribution represented by $p(k|\hat{q}^{prior})$. It is desirable that the prior distribution may approximate the posterior distribution as much as possible, so that the prior knowledge selection module 2501 may also capture the correct knowledge even if there is no dialogue response y corresponding to the source speech x. Accordingly, an auxiliary loss is introduced, and in some embodiments, the auxiliary loss may be a KLDivLoss to measure the approximation between the prior distribution and the posterior distribution.

In some embodiments, the prior distribution may be used for accurately approximating the posterior distribution when minimizing the KLDivLoss. Therefore, even if the posterior distribution is not known when the dialogue framework generates the dialogue response, the prior distribution may be effectively used to sample the correct knowledge, so as to generate the appropriate dialogue response.

Decoder 204

In this embodiment of the disclosure, the knowledge selected by the knowledge management module 205 is integrated into the generated dialogue response. The knowledge selected by the knowledge management module 205 greatly helps the decoder 204 to generate the high quality dialogue response.

The source speech x and the dialogue response y generally refer to a round of user input and a system response in an intelligent dialogue process, which is not specifically limited in this embodiment of the disclosure.

In summary, how to utilize the external knowledge in an open-domain dialogue system is very important. However, in the related art, due to the lack of necessary posterior information, it is difficult for the prior knowledge selection module to learn how to approximate the posterior distribution during training, and the prior selection module may select inappropriate knowledge during deployment. In the dialogue framework provided in this embodiment of the disclosure, the problems may be solved through the posterior information prediction module, and the accuracy of knowledge selection may be significantly improved through the predicted posterior information. In addition, the dialogue generation method provided in this embodiment of the disclosure is a general method, which may be applied to a plurality of hidden variable models.

Descriptions such as "first", "second", "third", "fourth", and the like described in the following embodiments are only intended to distinguish between similar objects but do not constitute any other limitation.

Figure 3:
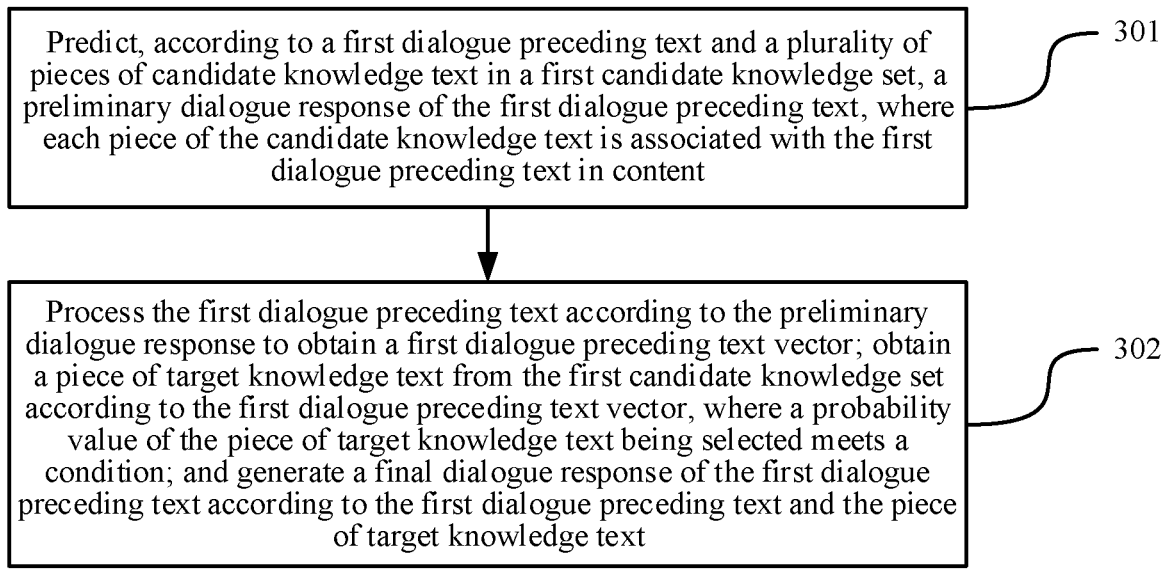
FIG. 3 is a flowchart of a dialogue generation method according to an embodiment of the disclosure.

FIG. 3 is a flowchart of a dialogue generation method according to an embodiment of the disclosure. The method in FIG. 3 may be performed by the intelligent dialogue robot shown in FIG. 1, and in detail, the knowledge-grounded dialogue framework shown in FIG. 2. Using a deployment stage shown in FIG. 2 as an example, referring to FIG. 3, a method process provided in this embodiment of the disclosure includes the following steps 301, 302.

301. Predict, according to a first dialogue preceding text and a plurality of pieces of candidate knowledge text in a first candidate knowledge set, a preliminary dialogue response of the first dialogue preceding text, where each piece of the candidate knowledge text is associated with the first dialogue preceding text in content.

The first dialogue preceding text is also referred to as the target dialogue preceding text in this specification.

In this step, a first dialogue preceding text is obtained; and a first candidate knowledge set is obtained according to the first dialogue preceding text, where the first candidate knowledge set includes the piece of candidate knowledge text that is associated with the first dialogue preceding text in content. Then, the preliminary dialogue response of the first dialogue preceding text is predicted according to the first dialogue preceding text and the first candidate knowledge set.

In the deployment stage, a user input to be responded by the intelligent dialogue robot is referred to as the first dialogue preceding text in this specification.

In some embodiments, the user input may be in either a text form or a voice form, which is not specifically limited in this embodiment of the disclosure. The candidate knowledge set corresponding to the user input is referred to as the first candidate knowledge set in this specification, and the first candidate knowledge set includes the piece of candidate knowledge text that is associated with the user input in content. In addition, the quantity of pieces of candidate knowledge text included in the first candidate knowledge set may be more than one.

In addition, in the deployment stage, after receiving the user input, the intelligent dialogue robot respectively inputs the user input to the encoder 201 and the information retrieval module 207 in FIG. 2. The encoder 201 is configured to perform encoding processing on the user input, and the information retrieval module 207 is responsible for retrieving the piece of candidate knowledge text that is associated with the user input in content in the first candidate knowledge set.

In this step, the posterior information prediction module 206 shown in FIG. 2 is responsible for providing the preliminary dialogue response of the first dialogue preceding text. In other words, the preliminary dialogue response is the posterior information predicted by the posterior information prediction module 206.

In some embodiments, the predicting, according to a first dialogue preceding text and a plurality of pieces of candidate knowledge text in a first candidate knowledge set, a preliminary dialogue response of the first dialogue preceding text specifically includes the following steps.

3011. Perform first encoding processing on the first dialogue preceding text to obtain a first query vector.

The first encoding process performed on the first dialogue preceding text is completed by the encoder 201 shown in FIG. 2. The first query vector is an encoded vectorized representation of the first dialogue preceding text.

In some embodiments, after the first dialogue preceding text passes through the encoder 201, a vectorized representation $H^x$ of the first dialogue preceding text is obtained. Further, $h^x=\text{Mean}(H^x)\in \mathbb{R}^d$, where $h^x$ is a sentence vector representation after average pooling is performed on the first dialogue preceding text. As shown in FIG. 2, in this step, a query vector $q^{PI}=h^x$ of the posterior information prediction module 206 is generated. In addition, the query vector obtained herein is referred to as the first query vector in this specification.

3012. Perform second encoding processing on the first candidate knowledge set to obtain a feature vector of each piece of candidate knowledge in the first candidate knowledge set.

The second encoding processing performed on the first candidate knowledge set is completed by the encoder 202 shown in FIG. 2.

3013. Determine a feature vector of the first candidate knowledge set according to a first query vector of the first dialogue preceding text and a feature vector of each piece of the candidate knowledge.

In some embodiments, the first query vector pays attention to the first candidate knowledge set in a manner of dot product attention, and abstracts the first candidate knowledge set into a vector representation based on an attention weight.

That is, in this embodiment of the disclosure, an attention mechanism is integrated into a natural language processing task, and a dialogue framework in combination with the attention mechanism pays great attention to feature information of a specific target in the training process, and may effectively adjust network parameters for different targets and mine more hidden feature information.

The attention mechanism stems from a study of human vision. In cognitive science, due to the bottleneck of Information processing, humans selectively focus on a part of all information while ignoring other visible information. The foregoing mechanism may be referred to as the attention mechanism. The attention mechanism is a brain signal processing mechanism unique to human vision. The human vision obtains a target area that needs to be focused on by quickly scanning a global image, that is, a focus of attention, and then invests more attention resources in the area to obtain more detailed information of a target that needs to be focused, while suppressing other useless information.

In summary, the attention mechanism has two main aspects: deciding which part of an input needs to be paid attention to; and allocating the limited information processing resources to the important part. The attention mechanism in deep learning is essentially similar to a selective visual attention mechanism of human beings, and a core goal is to select information that is more critical to a current task from a large number of information.

3014. Generate the preliminary dialogue response according to the first query vector and the feature vector of the first candidate knowledge set.

The first feature vector is a vectorized representation of the preliminary dialogue response.

This step is completed by the posterior information prediction module 206, where the posterior information prediction module 206 predicts the posterior information $\hat{I}$ according to the first query vector and the feature vector of the first candidate knowledge set, and the posterior information $\hat{I}$ is the preliminary dialogue response predicted by the dialogue framework and corresponding to the first dialogue preceding text.

302. Process the first dialogue preceding text according to the preliminary dialogue response to obtain a first dialogue preceding text vector; obtain a piece of target knowledge text from the first candidate knowledge set according to the first dialogue preceding text vector, where a probability value of the piece of target knowledge text of being selected (to be used in generating a final dialogue response of the first dialogue preceding text) meets a condition; and generate a final dialogue response of the first dialogue preceding text according to the first dialogue preceding text and the piece of target knowledge text.

In this embodiment of the disclosure, because the prior knowledge selection module 2051 cannot obtain standard posterior information in the deployment stage, this embodiment of the disclosure provides the posterior information $\hat{I}$ predicted by the posterior information prediction module 206 to enhance the capability of prior knowledge selection. That is, the step of screening the piece of target knowledge text in the first candidate knowledge set is completed by the prior knowledge selection module 2051 according to the first dialogue preceding text and the preliminary dialogue response.

In some embodiments, the processing the first dialogue preceding text according to the preliminary dialogue response may include: updating the first dialogue preceding text according to the preliminary dialogue response, where the updating the first dialogue preceding text according to the preliminary dialogue response includes updating the first query vector according to the first feature vector of the preliminary dialogue response outputted by the posterior information prediction module 206, where the updated first query vector is also referred to as the first dialogue preceding text vector in this specification. That is, the prior query is updated by using the predicted posterior information in an organization manner similar to the posterior query. In other words, the processing the first dialogue preceding text according to the preliminary dialogue response to obtain a first dialogue preceding text vector may include the following steps.

Step a. Obtain a first parameter matrix, where a first intermediate feature vector is generated according to a first feature vector and a first parameter matrix of the preliminary dialogue response. The step is expressed in a mathematical formula as follows:

$$e^I=\hat{I}_{bow}\cdot E \in \mathbb{R}^d \text{ or } e^I=\text{Mean}(\hat{I}_{seq}\cdot E)\in \mathbb{R}^d,$$

where E refers to the first parameter matrix. In some embodiments, E may be an embedding matrix; Mean( ) refers to an average pooling operation; $\hat{I}_{bow}$ and $\hat{I}_{seq}$ refer to the first feature vector, with a difference that $\hat{I}_{bow}$ refers to the posterior information based on a bag-of-words form, and $\hat{I}_{seq}$ refers to the posterior information based on a sentence form; and $e^I$ refers to the first intermediate feature vector.

Step b. Perform feature splicing processing on the first query vector of the first dialogue preceding text and the first intermediate feature vector to obtain an updated first query vector, that is, the first dialogue preceding text vector. The step is expressed in a mathematical formula as follows:

$$\hat{q}^{Prior} = [q^{prior}; e^I],$$

where $\hat{q}^{Prior}$ refers to the updated first query vector; and $q^{Prior}$ refers to the first query vector before the update.

In some embodiments, the obtaining a piece of target knowledge text from the first candidate knowledge set according to the first dialogue preceding text vector includes: obtaining a probability value of each piece of the candidate knowledge text being selected in the first candidate knowledge set according to the first dialogue preceding text vector; and determining the piece of target knowledge text according to the probability value of each piece of the candidate knowledge text being selected. The obtaining a probability value of each piece of the candidate knowledge text being selected in the first candidate knowledge set according to the first dialogue preceding text vector may include the following steps.

3021. Obtain a second parameter matrix, where a second intermediate feature vector is generated according to a second parameter matrix and the first dialogue preceding text vector. The step is expressed in a mathematical formula as follows:

$$v^{prior} = W_2 \hat{q}^{Prior} \in \mathbb{R}^d,$$

where $v^{prior}$ refers to the second intermediate feature vector, and $W_2$ refers to the second parameter matrix.

3022. Determine the probability value of each piece of the candidate knowledge text being selected (to be used in generating the final dialogue response) according to the second intermediate feature vector and a feature vector of each piece of the candidate knowledge.

In this step, the probability value of each piece of the candidate knowledge text being selected is obtained in a manner of dot product attention based on the updated prior query. The step is expressed in a mathematical formula as follows:

$$a^{Prior}(\mathcal{K}) = \text{softmax}([h^{k^1}, \ldots, h^{k^L}] \cdot v^{prior}) \in \mathbb{R}^L,$$

where $a^{Prior}(\mathcal{K})$ refers to the probability value of each piece of the candidate knowledge text being selected in the first candidate knowledge set, and the probability value is also referred to as the prior knowledge selection probability in this specification. $[h^{k^1}, \ldots, h^{k^L}]$ refers to the feature vector of each piece of the candidate knowledge text.

In some embodiments, the determining the piece of target knowledge text according to the probability value of each piece of the candidate knowledge text of being selected may include: using the piece of candidate knowledge text with the highest probability value being selected in the first candidate knowledge set as the piece of target knowledge text. In this step, the most suitable piece of candidate knowledge (such as the highest probability value) is selected for dialogue generation according to the prior knowledge selection probability.

The first parameter matrix and the second parameter matrix are both network parameters, which may be randomly initialized and obtained through training in the training stage.

In the method provided in this embodiment of the disclosure, the posterior information prediction module in the dialogue frame may be configured to predict the posterior information in the deployment stage, where the predicted posterior information is used for enhancing the capability of prior knowledge selection of the prior knowledge selection module. That is, additional posterior information provided by the posterior information prediction module may help prior knowledge selection during deployment. The solution may significantly improve the accuracy of knowledge selection of the knowledge management module, thereby improving the dialogue generation quality of the intelligent dialogue robot.

Figure 4:
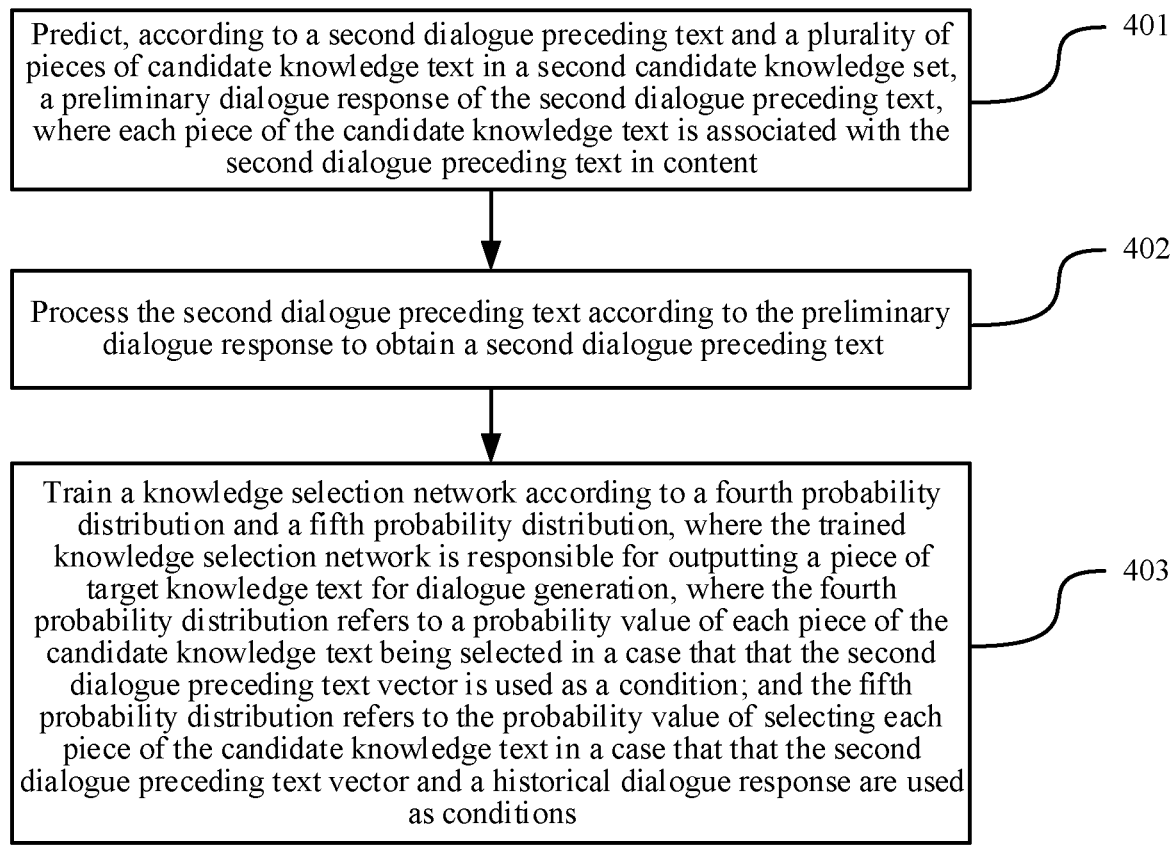
FIG. 4 is a flowchart of a network training method according to an embodiment of the disclosure.

FIG. 4 is a flowchart of a network training method according to an embodiment of the disclosure. The method in FIG. 4 may be performed by the intelligent dialogue robot shown in FIG. 1, and in detail, the knowledge-grounded dialogue framework shown in FIG. 2. Using a training stage shown in FIG. 2 as an example, referring to FIG. 4, a method process provided in this embodiment of the disclosure includes the following steps 401-403.

401. Predict, according to a second dialogue preceding text and a plurality of pieces of candidate knowledge text in a second candidate knowledge set, a preliminary dialogue response of the second dialogue preceding text, where each piece of the candidate knowledge text is associated with the second dialogue preceding text in content.

The second dialogue preceding text is also referred to as the historical dialogue preceding text in this specification. In this step, historical dialogue corpora is obtained, and the historical dialogue corpora includes a historical dialogue preceding text and a historical dialogue response. In this embodiment of the disclosure, the historical dialogue corpora used for training includes a plurality of pairs (the historical dialogue preceding text and the historical dialogue response). Then, the second candidate knowledge set is obtained according to the second dialogue preceding text.

The candidate knowledge set corresponding to the second dialogue preceding text is referred to as the second candidate knowledge set in this specification, and the second candidate knowledge set includes the piece of candidate knowledge text that is associated with the second dialogue preceding text in content. That is, the pieces of the candidate knowledge text described herein all come from the second candidate knowledge set. In addition, the quantity of pieces of the candidate knowledge text included in the second candidate knowledge set may be more than one. In addition, for the implementation of this step, reference may be made to the foregoing step 301.

402. Process the second dialogue preceding text according to the preliminary dialogue response to obtain a second dialogue preceding text vector.

In some embodiments, the processing the second dialogue preceding text according to the preliminary dialogue response may include: updating the second dialogue preceding text according to the preliminary dialogue response. For the implementation of this step, reference may be made to the foregoing step 302.

403. Train a knowledge selection network according to a fourth probability distribution and a fifth probability distribution, where the trained knowledge selection network is responsible for outputting a piece of target knowledge text for dialogue generation, where the fourth probability distribution refers to a probability value of each piece of the candidate knowledge text being selected in a case that the second dialogue preceding text vector is used as a condition; and the fifth probability distribution refers to the probability value of selecting each piece of the candidate knowledge text in a case that the second dialogue preceding text vector and a historical dialogue response are used as conditions.

In other words, the fourth probability distribution uses the updated second dialogue preceding text as a condition and samples the second candidate knowledge set; and the fifth probability distribution uses the second dialogue preceding text and the historical dialogue response as conditions and samples the second candidate knowledge set.

The knowledge selection network corresponds to the knowledge management module 205 in FIG. 2. The fourth probability distribution is the prior distribution obtained by the prior knowledge selection module 2051; and the fifth probability distribution is the posterior distribution obtained by the posterior knowledge selection module 2052; where both the fourth probability distribution and the fifth probability distribution give the probability values of each piece of the candidate knowledge being selected in the second candidate knowledge set. For how to obtain the probability value of each piece of the candidate knowledge being selected in the second candidate knowledge set, reference may be made to the foregoing step 302.

In some embodiments, the training a knowledge selection network according to a fourth probability distribution and a fifth probability distribution includes: constructing a KLDivLoss function according to the fourth probability distribution and the fifth probability distribution; and continuously optimizing a network parameter of the knowledge selection network until the KLDivLoss function is minimized.

In this embodiment of the disclosure, to cause the prior distribution to approximate the posterior distribution as much as possible, an auxiliary loss is introduced. In some embodiments, the auxiliary loss may be a KLDivLoss to measure the approximation between the prior distribution and the posterior distribution. In some embodiments, the prior distribution may be used for accurately approximating the posterior distribution when minimizing the KLDivLoss. Therefore, even if the posterior distribution is not known when the dialogue framework generates the dialogue response in the deployment stage, the prior distribution may be effectively used to sample the correct knowledge, so as to generate the appropriate dialogue response.

The posterior information prediction module 206 shown in FIG. 2 is also referred to as a prediction network in this specification.

In some embodiments, a training process of the prediction network includes: determining the feature vector of the second candidate knowledge set according to the second query vector of the second dialogue preceding text and the feature vector of each piece of the candidate knowledge text in the second candidate knowledge set; and using the second query vector and the feature vector of the second candidate knowledge set as a network input, using the historical dialogue response as a network expected output, and training a prediction network.

In some embodiments, first encoding processing is performed on the second dialogue preceding text to obtain a second query vector. That is, the second query vector is an encoded vectorized representation of the second dialogue preceding text; and second encoding processing is performed on the second candidate knowledge set to obtain a feature vector of each piece of candidate knowledge text in the second candidate knowledge set.

In some embodiments, after the encoder 202 is passed through, a feature vector of each piece of the candidate knowledge text in the second candidate knowledge set is obtained. The feature vectors of the plurality of pieces of the candidate knowledge text may be expressed by the following formula:

$$h^{k^1}, \ldots, h^{k^L}$$

In some embodiments, the determining a feature vector of the second candidate knowledge set according to a second query vector of the second dialogue preceding text and a feature vector of each piece of the candidate knowledge text includes:

Step a. Obtain a third parameter matrix, where a third intermediate feature vector is generated according to the third parameter matrix and the second query vector of the second dialogue preceding text. The step is expressed in a mathematical formula as follows:

$$v = W_3 q^{PI} \in \mathbb{R}^d,$$

where V refers to the third intermediate feature vector, and $W_3$ refers to the third parameter matrix.

Step b. Obtain an attention weight of the second candidate knowledge set according to the third intermediate feature vector and the feature vector of each piece of the candidate knowledge in the second candidate knowledge set. The step is expressed in a mathematical formula as follows:

$$a^{PI}(\mathcal{K}) = \text{softmax}([h^{k^1}, \ldots, h^{k^L}] \cdot v) \in \mathbb{R}^L,$$

where $a^{PI}(\mathcal{K})$ refers to the attention weight of the second candidate knowledge set.

Step c. Determine the feature vector of the second candidate knowledge set according to the feature vector of each piece of the candidate knowledge in the second candidate knowledge set and the obtained attention weight. The step is expressed in a mathematical formula as follows:

$$h^{PI} = [h^{k^1}, \ldots, h^{k^L}] \cdot a^{PI}(\mathcal{K}) \in \mathbb{R}^d$$

In addition, the third parameter matrix is a network parameter, which may be randomly initialized and obtained through training in the training stage.

In some other embodiments, a form of the prediction network includes, but is not limited to, a feedforward neural network and a decoder of the Transformer model. For example, the feedforward neural network is a two-layer feedforward neural network, and the decoder is a three-layer Transformer decoder with a copy mechanism, which is not specifically limited in this embodiment of the disclosure.

For a manner in which the prediction network is a feedforward neural network, in this embodiment of the disclosure, posterior information is generated based on the bag-of-words form; and for a manner in which the prediction network is the decoder of the Transformer model, in this embodiment of the disclosure, the posterior information is generated based on the sentence form. In the training stage, in this embodiment of the disclosure, the prediction network is trained based on the historical dialogue corpora and the supervision signal $\mathcal{L}_{PIPM}$, so that the prediction network may generate meaningful posterior information $\hat{I}$ in the deployment stage.

Figure 5:
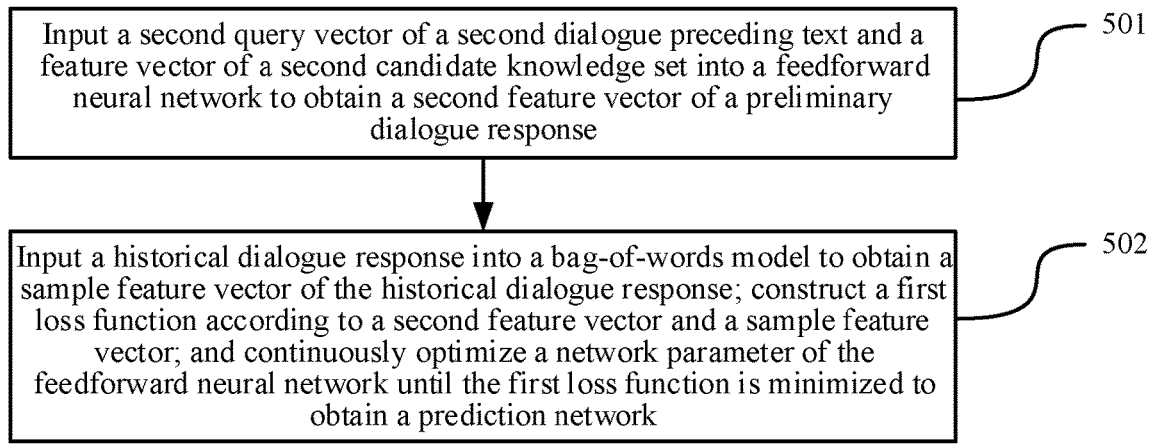
FIG. 5 is a flowchart of another network training method according to an embodiment of the disclosure.

In some embodiments, in response to the prediction network being a feedforward neural network, as shown in FIG. 5, the training process of the prediction network includes the following steps 501-502.

501. Input the second query vector of the second dialogue preceding text and the feature vector of the second candidate knowledge set into the feedforward neural network to obtain a second feature vector of the preliminary dialogue response.

The second feature vector is a vectorized representation of the preliminary dialogue response of the second dialogue preceding text.

In this step, the second dialogue preceding text and the candidate knowledge representation are mapped into posterior information $\hat{I}_{bow} \in \mathbb{R}^{|V|}$ through the feedforward neural network, where the posterior information is also referred to as the preliminary dialogue response of the second dialogue preceding text in this specification, and the preliminary dialogue response is a bag-of-words form that does not include word order.

502. Input the historical dialogue response into a bag-of-words model to obtain a sample feature vector of the historical dialogue response; construct a first loss function according to the second feature vector and the sample feature vector; and continuously optimize a network parameter of the feedforward neural network until the first loss function is minimized to obtain the prediction network.

The dialogue response information y, that is, the historical dialogue response, may be obtained in the training stage. Based on the sample feature vector I=BOW(y) of the historical dialogue response, an additional loss function is introduced to supervise the prediction network to generate meaningful posterior information, where the loss function is referred to as the first loss function in this specification.

In some embodiments, a calculation formula of the first loss function is as follows.

$$\mathcal{L}_{PIPM} = -1/|I| \sum_{w \in I} \log(\hat{I}_{bow}^{w}),$$

where w refers to words from a bag of words I; and $\hat{I}_{bow}^{w}$ refers to the posterior information corresponding to the word w outputted by the prediction network.

Figure 6:
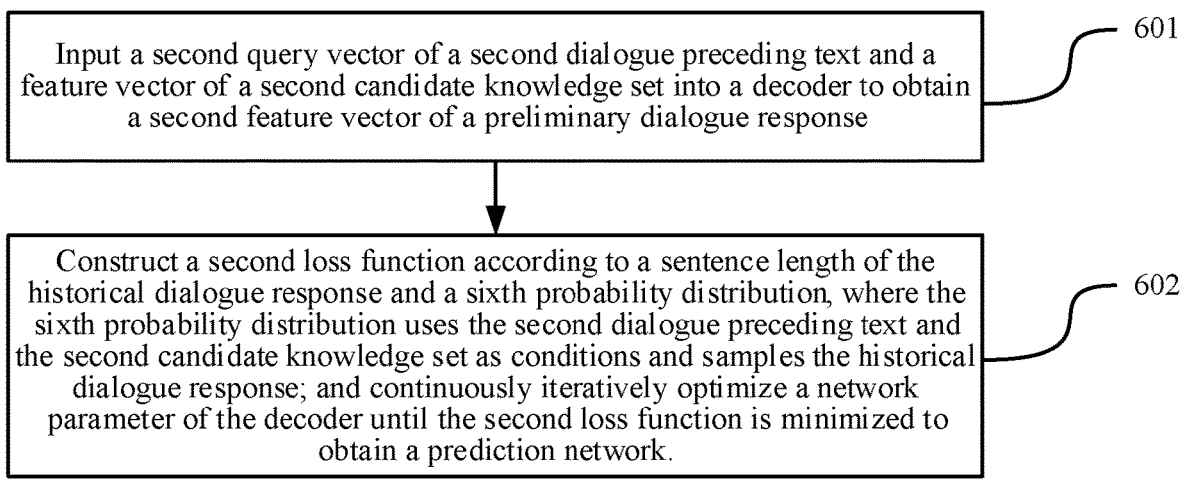
FIG. 6 is a flowchart of another network training method according to an embodiment of the disclosure.

In some other embodiments, in response to the prediction network being the decoder of the Transformer model, as shown in FIG. 6, the training process of the prediction network includes the following steps 601-602.

601. Input the second query vector of the second dialogue preceding text and the feature vector of the second candidate knowledge set into the decoder to obtain a second feature vector of the preliminary dialogue response.

In this step, the second dialogue preceding text and the candidate knowledge representation are mapped into posterior information $\hat{I}_{seq} \in \mathbb{R}^{N*|V|}$ through the decoder of the Transformer model, where the posterior information is also referred to as the preliminary dialogue response of the second dialogue preceding text in this specification, and the preliminary dialogue response is a sentence form including word order, a value of N is a positive integer, and N refers to a sentence length of the historical dialogue response.

602. Construct a second loss function according to a sentence length of the historical dialogue response and a sixth probability distribution, where the sixth probability distribution uses the second dialogue preceding text and the second candidate knowledge set as conditions and samples the historical dialogue response; and continuously iteratively optimize a network parameter of the decoder until the second loss function is minimized to obtain the prediction network.

In other words, the sixth probability distribution refers to a probability of selecting each word in the historical dialogue response in a case that the second dialogue preceding text and the second candidate knowledge set are used as conditions.

The dialogue response information y, that is, the historical dialogue response, may be obtained in the training stage. Based on I=y, an additional loss function is introduced to supervise the prediction network to generate meaningful posterior information, where the loss function is referred to as the second loss function in this specification.

In some embodiments, a calculation formula of the second loss function is as follows.

$$\mathcal{L}_{PIPM} = -1/N \sum_{n} \log p_\theta(y_n | x, \mathcal{K}),$$

where a value of n is a positive integer, n refers to words included in the historical dialogue response, x refers to the second dialogue preceding text, and $\mathcal{K}$ refers to the second candidate knowledge set herein; and $p_\theta(y_n | x, \mathcal{K})$ refers to the sixth probability distribution, and $\theta$ is the network parameter.

In summary, in the training stage, the posterior information prediction module learns to generate meaningful posterior information through the training of a supervisory signal $\mathcal{L}_{PIPM}$ by using the dialogue corpora; in this way, in the deployment stage, the posterior information prediction module updates prior query $q^{prior}$ with the posterior information predicted by the posterior information prediction module in an organization manner similar to the posterior query $q^{post}$; and therefore, the prior knowledge selection module is caused to perform prior knowledge selection based on the updated prior query $\hat{q}^{prior}$. In this way, additional posterior information provided by the posterior information prediction module may help prior knowledge selection during deployment. Therefore, the solution may significantly improve the accuracy of knowledge selection of the knowledge management module, thereby improving the dialogue generation quality of the intelligent dialogue robot.

In some other embodiments, in response to the prediction network being the decoder of the Transformer model, the step 3014 "generating the preliminary dialogue response according to the first query vector and the feature vector of the first candidate knowledge set" may be implemented as follows:

adding the first query vector and the feature vector of the first candidate knowledge set to obtain an input feature vector; using the input feature vector as an input of a decoder; calling the decoder to obtain a first probability distribution according to the input feature vector and a target feature vector at a current moment (or a current time); then, generating a third probability distribution according to the first probability distribution and a second probability distribution; determining words outputted at the current moment according to the third probability distribution; and finally, determining words outputted by the decoder at each moment as the preliminary dialogue response, where the target feature vector is used for representing a decoder state at the current moment, the first probability distribution is a weight of copying words in the first dialogue preceding text at the current moment, and the second probability distribution is a probability distribution of a word list generated at the current moment.

In some embodiments, the obtaining a first probability distribution according to the input feature vector and a target feature vector includes: obtaining a query matrix of the decoder according to a first mapping matrix and the target feature vector; obtaining a key matrix of the decoder according to a second mapping matrix and the input feature vector; and obtaining the first probability distribution according to the query matrix and the key matrix.

The decoder is divided into a plurality of moments (also referred to as time steps) to output words. Generally, one word is outputted at a moment, and the words that are outputted constitute the preliminary dialogue response. Next, detailed description of a process in which the decoder generates the preliminary dialogue response is made in combination with the following examples.

$$h_n^y = \text{Decoder}(H^x + h^{PI}, H_{<n}^y)$$

$$p_n^{gen}(w) = \text{softmax}(W_{out} h_n^y)$$

$$q_n, K, V = h_n^y W_q^T, (H^x + h^{PI}) W_k^T, (H^x + h^{PI}) W_v^T$$

$$p_n^{cp}(w) = \text{softmax}(q_n K)$$

$$\alpha_n^{cp} = \sigma(W_{cp}^T \Sigma p_n^{cp}(w) \cdot V)$$

$$p_n(w) = (1 - \alpha_n^{cp}) * p_n^{gen}(w) + \alpha_n^{q} * p_n^{cp}(w)$$

$$\hat{I}_{seq}^{n+1} = \text{argmax}_{\omega \in V} p_n(w)$$

The textual description of the code includes:

adding the first query vector $H^x$ and the feature vector $h^{PI}$ of the first candidate knowledge set to obtain an input feature vector $(H^x + h^{PI})$, and using the input feature vector $(H^x + h^{PI})$ as an input of the decoder. In some embodiments, the decoder generates the preliminary dialogue response by the following steps:

For the current moment, a query matrix of the decoder is obtained according to a first mapping matrix $W_q^T$ and the target feature vector $h_n^y$, where the target feature vector $h_n^y$ is used for representing the decoder state at the current moment; a key matrix of the decoder is obtained according to a second mapping matrix $W_k^T$ and the input feature vector; and a value matrix of the decoder is obtained according to a third mapping matrix $W_v^T$ and the input feature vector. In other words, the target feature vector $h_n^y$ is mapped to the query matrix $q_n$ according to a first mapping matrix $W_q^T$; the input feature vector $(H^x + h^{PI})$ is mapped to a key matrix K according to the second mapping matrix $W_k^T$; and the input feature vector is mapped to a value matrix V at the current moment according to the third mapping matrix $W_v^T$. The first mapping matrix $W_q^T$, the second mapping matrix $W_k^T$, and the third mapping matrix $W_v^T$ may be randomly initialized and obtained through training, which is not specifically limited in this embodiment of the disclosure.

Then, the first probability distribution $p_n^{cp}(w) = \text{softmax}(q_n K)$ is obtained according to the query matrix $q_n$ and the key matrix K, where the first probability distribution $p_n^{cp}(w) = \text{softmax}(q_n K)$ is a weight of copying the words in the first dialogue preceding text at the current moment; a first numerical value $\alpha_n^{cp}$ is obtained according to the value matrix V, where the first numerical value $\alpha_n^{cp}$ is used for indicating the probability that the word generated at the current moment derives from the first dialogue preceding text; and then, a third probability distribution $p_n(w) = (1 - \alpha_n^{cp}) * p_n^{gen}(w) + \alpha_n^{q} * p_n^{cp}(w)$ is generated according to the first probability distribution $p_n^{cp}(w)$, the second probability distribution $p_n^{gen}(w)$, and the first numerical value $\alpha_n^{cp}$. In some embodiments, the second probability distribution $p_n^{gen}(w) = \text{softmax}(W_{out} h_n^y)$ is the probability distribution of a word list generated at the current moment.

In some embodiments, the word with the highest probability value is obtained from the third probability distribution $p_n(w)$, and the selected word is used as an output of the decoder at the current moment.

In this embodiment of the disclosure, the output of the decoder at a plurality of moments is used as the preliminary dialogue response. That is, the preliminary dialogue response includes the output of the decoder at a previous moment, the output of the decoder at a current moment, and the output of the decoder at a later moment. In addition, the decoder includes an attention layer (based on the attention mechanism), and the attention layer further includes a header structure (also referred to as an attention head). The query matrix of the decoder, the key matrix of the decoder, and the value matrix of the decoder are essentially the query matrix corresponding to the header structure, the key matrix corresponding to the header structure, and the value matrix corresponding to the header structure.

In this embodiment of the disclosure, meanings of each of the foregoing characters and expressions are as follows:

$h_n^y = \text{Decoder}(H^x + h^{PI}, H_{<n}^y)$, where $H^x \in \mathbb{R}^{m \times d}$ is the first query vector. In some embodiments, the first query vector is a word granularity representation encoded by bert (a language representation model representing a bidirectional encoder representation from Transformer) of the first dialogue preceding text, where a length of the first dialogue preceding text is m; and $H_{<n}^y \in \mathbb{R}^{n-1 \times d}$ and $h_n^y \in \mathbb{R}^{1 \times d}$ are the decoder states at the previous moment and the current moment of the decoder.

$p_n^{gen}(w) = \text{softmax}(W_{out} h_n^y)$ represents the probability distribution of the word list generated at the current moment, where $W_{out} \in \mathbb{R}^{|V| \times d}$ is a network parameter.

$q_n$, K, $V = h_n^y W_q^T, (H^x + h^{PI}) W_k^T, (H^x + h^{PI}) W_v^T$ represents that the decoder state $h_n^y$ at the current moment and an external input $(H^x + h^{PI})$ of the decoder are respectively mapped into the query matrix, the key matrix, and the value matrix through three mapping matrices.

$p_n^{cp}(w) = \text{softmax}(q_n K)$ obtains the attention vector of the query matrix to the key matrix through the dot product attention mechanism, which is used as the probability distribution of copy (copy mechanism). The weight of copying the words in the first dialogue preceding text at the current moment is determined through $p_n^{cp}(w)$.

$\alpha_n^{cp} = \sigma(W_{cp}^T \Sigma p_n^{cp}(w) \cdot V)$ is a scalar value between 0 and 1, and $\alpha_n^{cp}$ determines the probability that the generation of the word at the current moment comes from a copy manner; and 1 to $\alpha_n^{cp}$ is the probability that the generation of the word at the current moment comes from the generated word list.

$W_{cp}^T \in \mathbb{R}^{d \times 1}$ is the network parameter; and $\sigma$ is a sigmoid activation function.

$p_n(w) = (1 - \alpha_n^{cp}) * p_n^{gen}(w) + \alpha_n^{q} * p_n^{cp}(w)$ is the third probability distribution $p_n(w) \in \mathbb{R}^{|V|}$ based on $\alpha_n^{cp}$ after integration.

$\hat{I}_{seq}^{n+1} = \text{argmax}_{\omega \in V} p_n(w)$ represents selecting the word with the highest probability from the third probability distribution $p_n(w)$ as the output at the current moment.

In some other embodiments, the dot product attention mechanism adopted in this embodiment of the disclosure may be replaced with a self-attention mechanism; and in addition, the posterior information prediction module 206 generates the posterior information by using two types of networks. In addition to the two types of networks, the two types of networks may further be replaced with a deeper layer network, which is not specifically limited in this embodiment of the disclosure. In addition, in addition to an organization manner of the posterior information based on the bag-of-words form and the sentence form, other organization forms of the posterior information may further be considered and different forms are integrated. In addition, in this embodiment of the disclosure, an embedding matrix is adopted to obtain the predicted posterior information representation. In addition, the embedding matrix may be replaced with a more complex encoding mechanism, such as a self-attention mechanism, which is not specifically limited in this embodiment of the disclosure.

Figure 7:
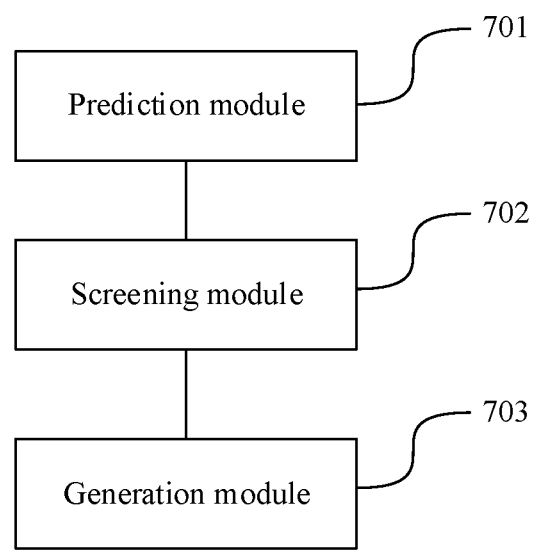
FIG. 7 is a schematic structural diagram of a dialogue generation apparatus according to an embodiment of the disclosure.

FIG. 7 is a schematic structural diagram of a dialogue generation apparatus according to an embodiment of the disclosure. Referring to FIG. 7, the apparatus includes:
- a prediction module 701, configured to predict, according to a first dialogue preceding text and a plurality of pieces of candidate knowledge text in a first candidate knowledge set, a preliminary dialogue response of the first dialogue preceding text, where each piece of the candidate knowledge text is associated with the first dialogue preceding text in content;
- a screening (or processing) module 702, configured to process the first dialogue preceding text according to the preliminary dialogue response to obtain a first dialogue preceding text vector; and obtaining a piece of target knowledge text from the first candidate knowledge set according to the first dialogue preceding text vector, wherein a probability value of the piece of target knowledge text being selected meets a condition; and
- a generation module 703, configured to generate a final dialogue response of the first dialogue preceding text according to the first dialogue preceding text and the piece of target knowledge text.

This embodiment of the disclosure provides an apparatus. In a process of human-machine dialogue, in this embodiment of the disclosure, the preliminary dialogue response of the dialogue preceding text is predicted based on the dialogue preceding text and the corresponding candidate knowledge set, and the piece of target knowledge text that meets the condition is selected from the corresponding candidate knowledge set to guide the dialogue generation according to the dialogue preceding text and the predicted preliminary dialogue response. In other words, in the process of human-machine dialogue, in this embodiment of the disclosure, knowledge selection may be helped through the predicted preliminary dialogue response. The solution may significantly improve the accuracy of knowledge selection, and a high-quality final dialogue response may be generated based on the accurate knowledge and the dialogue preceding text, thereby improving the dialogue generation quality of the intelligent dialogue robot. That is, in a process of human-machine interaction, in this embodiment of the disclosure, the high-quality dialogue response may be outputted to the user.

In some embodiments, the screening module is configured to:
- generate a first intermediate feature vector according to a first feature vector and a first parameter matrix of the preliminary dialogue response; and
- perform feature splicing on a first query vector of the first dialogue preceding text and the first intermediate feature vector to obtain the first dialogue preceding text vector, where the first query vector is an encoded vectorized representation of the first dialogue preceding text.

In some embodiments, the screening module is configured to:
- obtain a probability value of each piece of the candidate knowledge text being selected in the first candidate knowledge set according to the first dialogue preceding text vector; and
- determine the piece of target knowledge text according to the probability value of each piece of the candidate knowledge text being selected.

In some embodiments, the screening module is configured to:
- generate a second intermediate feature vector according to a second parameter matrix and the first dialogue preceding text vector; and
- determine the probability value of each piece of the candidate knowledge text being selected according to the second intermediate feature vector and a feature vector of each piece of the candidate knowledge text.

In some embodiments, the prediction module is configured to:
- determine a feature vector of the first candidate knowledge set according to a first query vector of the first dialogue preceding text and a feature vector of each piece of the candidate knowledge text, where the first query vector is an encoded vectorized representation of the first dialogue preceding text; and
- generate the preliminary dialogue response according to the first query vector and the feature vector of the first candidate knowledge set.

In some embodiments, the prediction module is configured to:
- add the first query vector and the feature vector of the first candidate knowledge set to obtain an input feature vector;
- use the input feature vector as an input of the decoder, and call the decoder to obtain a first probability distribution according to the input feature vector and a target feature vector at a current moment; generate a third probability distribution according to the first probability distribution and a second probability distribution; determine words outputted at the current moment according to the third probability distribution; and
- determine words outputted by the decoder at each moment as the preliminary dialogue response, where the target feature vector is used for representing a decoder state at the current moment, the first probability distribution is a weight of copying words in the first dialogue preceding text at the current moment, and the second probability distribution is a probability distribution of a word list generated at the current moment.

In some embodiments, the prediction module is configured to:
- obtain a query matrix of the decoder according to a first mapping matrix and the target feature vector;
- obtain a key matrix of the decoder according to a second mapping matrix and the input feature vector; and
- obtain the first probability distribution according to the query matrix and the key matrix.

Any combination of the foregoing optional technical solutions may be used to form an optional embodiment of the disclosure. Details are not described herein again.

Figure 8:
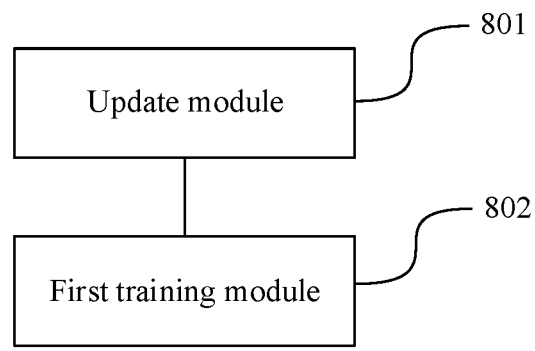
FIG. 8 is a schematic structural diagram of a network training apparatus according to an embodiment of the disclosure.

FIG. 8 is a schematic structural diagram of a network training apparatus according to an embodiment of the disclosure. Referring to FIG. 8, the apparatus includes:

an update module 801, configured to predict, according to a second dialogue preceding text and a plurality of pieces of candidate knowledge text in a second candidate knowledge set, a preliminary dialogue response of the second dialogue preceding text, where each piece of the candidate knowledge text is associated with the second dialogue preceding text in content; and process the second dialogue preceding text according to the preliminary dialogue response to obtain a second dialogue preceding text vector;

a first training module 802, configured to train a knowledge selection network according to a fourth probability distribution and a fifth probability distribution, where the knowledge selection network is responsible for outputting a piece of target knowledge text for dialogue generation, where the fourth probability distribution refers to a probability value of each piece of the candidate knowledge text being selected in a case that the second dialogue preceding text vector is used as a condition; and the fifth probability distribution refers to the probability value of each piece of the candidate knowledge text being selected in a case that the second dialogue preceding text vector and a historical dialogue response are used as conditions; and match the historical dialogue response with the second dialogue preceding text.

This embodiment of the disclosure provides an apparatus. In the training stage, the posterior information (preliminary dialogue response) prediction may be implemented by using the second dialogue preceding text and the second candidate knowledge set. The posterior information is used for generating a second dialogue preceding text vector, thereby generating the prior distribution (fourth probability distribution) based on the second dialogue preceding text vector and the second candidate knowledge set, so that in the training stage, the prior distribution may better approximate the posterior distribution (the fifth probability distribution); and in this way, in the deployment stage, the knowledge selection network may properly perform knowledge selection. Therefore, the solution may significantly improve the accuracy of knowledge selection of the knowledge selection network in a process of human-machine dialogue, thereby improving the dialogue generation quality of the intelligent dialogue robot.

In some embodiments, the first training module 802 is configured to:

construct a KLDivLoss function according to the fourth probability distribution and the fifth probability distribution; and continuously optimize a network parameter of the knowledge selection network until the KLDivLoss function is minimized.

In some embodiments, the apparatus further includes a second training module, where the second training module is configured to:

determine a feature vector of the second candidate knowledge set according to a second query vector of the second dialogue preceding text and a feature vector of each piece of the candidate knowledge text, where the second query vector is an encoded vectorized representation of the second dialogue preceding text; and use the second query vector and the feature vector of the second candidate knowledge set as a network input, use the historical dialogue response as a network expected output, and train a prediction network, where the prediction network is responsible for outputting a preliminary dialogue response of the first dialogue preceding text.

In some embodiments, the prediction network is a feed-forward neural network; and the second training module is configured to:

input the second query vector and the feature vector of the second candidate knowledge set into the feedforward neural network to obtain a second feature vector of the preliminary dialogue response;

input the historical dialogue response into a bag-of-words model to obtain a sample feature vector;

construct a first loss function according to the second feature vector and the sample feature vector; and continuously optimize a network parameter of the feedforward neural network until the first loss function is minimized to obtain the prediction network.

In some embodiments, the prediction network is a decoder of a Transformer model; and the second training module is configured to:

input the second query vector and the feature vector of the second candidate knowledge set into the decoder to obtain a second feature vector of the preliminary dialogue response;

construct a second loss function according to a sentence length of the historical dialogue response and a sixth probability distribution, where the sixth probability distribution refers to a probability of each word in the historical dialogue response being selected in a case that the second dialogue preceding text and the second candidate knowledge set are used as conditions; and continuously iteratively optimize a network parameter of the decoder until the second loss function is minimized to obtain the prediction network.

In some embodiments, the second training module is configured to:

generate a third intermediate feature vector according to a third parameter matrix and the second query vector;

obtain an attention weight of the second candidate knowledge set according to the third intermediate feature vector and the feature vector of each piece of the candidate knowledge text; and determine the feature vector of the second candidate knowledge set according to the feature vector of each piece of the candidate knowledge text and the attention weight.

Any combination of the foregoing optional technical solutions may be used to form an optional embodiment of the disclosure. Details are not described herein again.

When the dialogue generation apparatus provided in the foregoing embodiments generates dialogue, and when the network training apparatus trains the network training model, division of the foregoing functional modules is merely an example for descriptions. During actual application, the foregoing functions may be allocated to and completed by different functional modules as required. That is, the internal structure of the apparatus is divided into different functional modules, to complete all or some of the foregoing described functions. In addition, the dialogue generation apparatus and the dialogue generation method embodiments provided in the foregoing embodiments may be based on the same inventive concept. For the specific implementation process, reference may be made to the method embodiments, and details are not described herein again.

Figure 9:
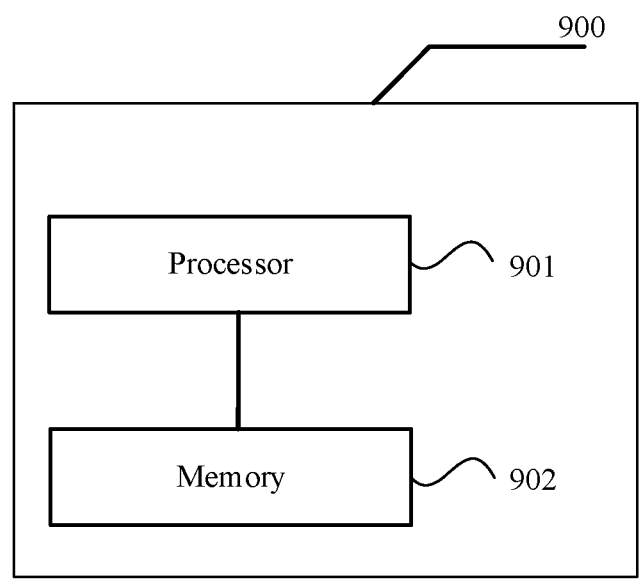
FIG. 9 is a schematic structural diagram of a computer device according to an embodiment of the disclosure.

FIG. 9 is a schematic structural diagram of a computer device according to an embodiment of the disclosure. The computer device may be represented by a server. The server 900 may vary greatly due to different configurations or performance, and may include one or more central processing units (CPUs) 901 and one or more memories 902. The memory 902 stores at least one piece of program code, the at least one piece of program code being loaded and executed by the processor 901 to implement the dialogue generation method or the network training method provided in the foregoing method embodiments. Certainly, the server may further include a wired or wireless network interface, a keyboard, an input/output interface and other components to facilitate input/output. The server may also include other components for implementing device functions. Details are not described herein again.

In an exemplary embodiment, a computer-readable storage medium, such as a memory including program code, is further provided, and the program code may be executed by a processor in a terminal to complete the dialogue generation method or the network training method in the foregoing embodiments. For example, the computer-readable storage medium may be a read-only memory (ROM), a random access memory (RAM), a compact disc ROM (CD-ROM), a magnetic tape, a floppy disk, an optical data storage device, or the like.

In an exemplary embodiment, a computer program product or a computer program is further provided, the computer program product or the computer program including computer program code, the computer program code being stored in a computer-readable storage medium, a processor of a computer device reading the computer program code from the computer-readable storage medium, and the processor executing the computer program code to cause the computer device to implement the foregoing dialogue generation method or the network training method.

A person of ordinary skill in the art would understand that all or some of the steps of the foregoing embodiments may be implemented by hardware, or may be implemented by a program code relevant hardware. The program may be stored in a computer-readable storage medium. The storage medium may be a read-only memory, a magnetic disk, an optical disc, or the like.

The foregoing descriptions are merely optional embodiments of the disclosure, but are not intended to limit the disclosure. Any modification, equivalent replacement, or improvement made within the spirit and principle of the disclosure shall fall within the protection scope of the disclosure.

What is claimed is:

1. A dialogue generation method, comprising:
predicting, based on a first dialogue preceding text and a plurality of pieces of candidate knowledge text in a first candidate knowledge set, a preliminary dialogue response of the first dialogue preceding text, wherein each piece of the candidate knowledge text is associated with the first dialogue preceding text in content;
processing the first dialogue preceding text based on the preliminary dialogue response to obtain a first dialogue preceding text vector;
obtaining a piece of target knowledge text from the first candidate knowledge set based on a probability value of the piece of target knowledge text of being selected to be used in generating a final dialogue response of the first dialogue preceding text, the probability value being obtained based on the first dialogue preceding text vector; and
generating the final dialogue response of the first dialogue preceding text based on the first dialogue preceding text and the piece of target knowledge text.

2. The method according to claim 1, wherein the processing the first dialogue preceding text comprises:
generating a first intermediate feature vector based on a first feature vector and a first parameter matrix of the preliminary dialogue response; and
performing feature splicing on a first query vector of the first dialogue preceding text and the first intermediate feature vector to obtain the first dialogue preceding text vector, wherein the first query vector is an encoded vectorized representation of the first dialogue preceding text.

3. The method according to claim 1, wherein the obtaining the piece of target knowledge text comprises:
obtaining a probability value of each piece of the candidate knowledge text of being selected to be used in generating the final dialogue response based on the first dialogue preceding text vector; and
determining the piece of target knowledge text, from the first candidate knowledge set, based on the probability value of each piece of the candidate knowledge text.

4. The method according to claim 3, wherein the obtaining the probability value of each piece of the candidate knowledge text comprises:
generating a second intermediate feature vector based on a second parameter matrix and the first dialogue preceding text vector; and
determining the probability value of each piece of the candidate knowledge text based on the second intermediate feature vector and a feature vector of each piece of the candidate knowledge text.

5. The method according to claim 1, wherein the predicting the preliminary dialogue response of the first dialogue preceding text comprises:
determining a feature vector of the first candidate knowledge set based on a first query vector of the first dialogue preceding text and a feature vector of each piece of the candidate knowledge text, wherein the first query vector is an encoded vectorized representation of the first dialogue preceding text; and
generating the preliminary dialogue response based on the first query vector and the feature vector of the first candidate knowledge set.

6. The method according to claim 5, wherein the generating the preliminary dialogue response comprises:
adding the first query vector and the feature vector of the first candidate knowledge set to obtain an input feature vector;
using the input feature vector as an input of a decoder, and calling the decoder to obtain a first probability distribution based on the input feature vector and a target feature vector at a current time, the target feature vector representing a decoder state at the current time, wherein the first probability distribution is a weight of copying words in the first dialogue preceding text at the current time;
generating a third probability distribution based on the first probability distribution and a second probability distribution, wherein the second probability distribution is a probability distribution of a word list generated at the current time;
determining words outputted at the current time based on the third probability distribution; and
determining words outputted by the decoder at each time as the preliminary dialogue response.

7. The method according to claim 6, wherein the obtaining the first probability distribution comprises:
 obtaining a query matrix of the decoder based on a first mapping matrix and the target feature vector;
 obtaining a key matrix of the decoder based on a second mapping matrix and the input feature vector; and
 obtaining the first probability distribution based on the query matrix and the key matrix.

8. A network training apparatus, comprising:
 at least one memory configured to store program code; and
 at least one processor configured to read the program code and operate as instructed by the program code, the program code comprising:
 prediction code configured to cause the at least one processor to predict, based on a second dialogue preceding text and a plurality of pieces of candidate knowledge text in a second candidate knowledge set, a preliminary dialogue response of the second dialogue preceding text, wherein each piece of the candidate knowledge text is associated with the second dialogue preceding text in content;
 processing code configured to cause the at least one processor to process the second dialogue preceding text based on the preliminary dialogue response to obtain a second dialogue preceding text vector;
 training code configured to cause the at least one processor to train a knowledge selection network based on a fourth probability distribution and a fifth probability distribution, wherein the knowledge selection network is responsible for outputting a piece of target knowledge text for dialogue generation, wherein
 the fourth probability distribution includes a probability value of each piece of the candidate knowledge text of being selected to be used in generating a final dialogue response of the second dialogue preceding text, the probability value being based on the second dialogue preceding text vector that is used as a condition; and
 the fifth probability distribution includes the probability value of each piece of the candidate knowledge text of being selected to be used in generating the final dialogue response of the second dialogue preceding text, the probability value being based on the second dialogue preceding text vector and a historical dialogue response that are used as conditions; and matching the historical dialogue response with the second dialogue preceding text.

9. The apparatus according to claim 8, wherein the training code is configured to cause the at least one processor to train the knowledge selection network by:
 constructing a KLDivLoss function based on the fourth probability distribution and the fifth probability distribution; and
 continuously optimizing a network parameter of the knowledge selection network until the KLDivLoss function is minimized.

10. The apparatus according to claim 8, wherein the program code further comprises:
 determining code configured to cause the at least one processor to determine a feature vector of the second candidate knowledge set based on a second query vector of the second dialogue preceding text and a feature vector of each piece of the candidate knowledge text, wherein the second query vector is an encoded vectorized representation of the second dialogue preceding text; and
 prediction network training code configured to cause the at least one processor to train a prediction network by using the second query vector and the feature vector of the second candidate knowledge set as a network input, and by using the historical dialogue response as a network expected output, wherein the prediction network is responsible for outputting a preliminary dialogue response of a first dialogue preceding text, which is to be responded.

11. The apparatus according to claim 10, wherein the prediction network is a feedforward neural network; and the prediction network training code is configured to cause the at least one processor to train the prediction network by:
 inputting the second query vector and the feature vector of the second candidate knowledge set into the feedforward neural network to obtain a second feature vector of the preliminary dialogue response;
 inputting the historical dialogue response into a bag-of-words model to obtain a sample feature vector;
 constructing a first loss function based on the second feature vector and the sample feature vector; and
 continuously optimizing a network parameter of the feedforward neural network until the first loss function is minimized to obtain the prediction network.

12. The apparatus according to claim 10, wherein the prediction network is a decoder of a Transformer model; and the prediction network training code is configured to cause the at least one processor to train the prediction network by:
 inputting the second query vector and the feature vector of the second candidate knowledge set into the decoder to obtain a second feature vector of the preliminary dialogue response;
 constructing a second loss function according to a sentence length of the historical dialogue response and a sixth probability distribution, wherein the sixth probability distribution includes a probability value of each word in the historical dialogue response of being selected to be used in generating the final dialogue response, the probability value being based on the second dialogue preceding text and the second candidate knowledge set that are used as conditions; and
 continuously iteratively optimizing a network parameter of the decoder until the second loss function is minimized to obtain the prediction network.

13. The apparatus according to claim 10, wherein the determining code is configured to cause the at least one processor to determine the feature vector of the second candidate knowledge set by:
 generating a third intermediate feature vector based on a third parameter matrix and the second query vector;
 obtaining an attention weight of the second candidate knowledge set based on the third intermediate feature vector and the feature vector of each piece of the candidate knowledge text; and
 determining the feature vector of the second candidate knowledge set based on the feature vector of each piece of the candidate knowledge text and the attention weight.

14. A dialogue generation apparatus, comprising:
 at least one memory configured to store program code; and
 at least one processor configured to read the program code and operate as instructed by the program code, the program code comprising:
 prediction code configured to cause the at least one processor to predict, based on a first dialogue preceding text and a plurality of pieces of candidate knowledge text in a first candidate knowledge set, a preliminary dialogue response of the first dialogue preceding text, wherein each piece of the candidate knowledge text is associated with the first dialogue preceding text in content;

processing code configured to cause the at least one processor to process the first dialogue preceding text based on the preliminary dialogue response to obtain a first dialogue preceding text vector; and obtain a piece of target knowledge text from the first candidate knowledge set based on a probability value of the piece of target knowledge text of being selected to be used in generating a final dialogue response of the first dialogue preceding text, the probability value being obtained based on the first dialogue preceding text vector; and generation code configured to cause the at least one processor to generate the final dialogue response of the first dialogue preceding text based on the first dialogue preceding text and the piece of target knowledge text.

15. The apparatus according to claim 14, wherein the processing code comprises:

generation sub-code configured to cause the at least one processor to generate a first intermediate feature vector based on a first feature vector and a first parameter matrix of the preliminary dialogue response; and obtaining sub-code configured to cause the at least one processor to perform feature splicing on a first query vector of the first dialogue preceding text and the first intermediate feature vector to obtain the first dialogue preceding text vector, wherein the first query vector is an encoded vectorized representation of the first dialogue preceding text.

16. The apparatus according to claim 14, wherein the processing code comprises:

obtaining sub-code configured to cause the at least one processor to obtain a probability value of each piece of the candidate knowledge text in the first candidate knowledge set based on the first dialogue preceding text vector; and determining sub-code configured to cause the at least one processor to determine the piece of target knowledge text, from the first candidate knowledge set, based on the probability value of each piece of the candidate knowledge text.

17. The apparatus according to claim 16, wherein the obtaining sub-code is configured to cause the at least one processor to:

generate a second intermediate feature vector based on a second parameter matrix and the first dialogue preceding text vector; and determine the probability value of each piece of the candidate knowledge text based on the second intermediate feature vector and a feature vector of each piece of the candidate knowledge text.

18. The apparatus according to claim 14, wherein the prediction code comprises:

determining sub-code configured to cause the at least one processor to determine a feature vector of the first candidate knowledge set based on a first query vector of the first dialogue preceding text and a feature vector of each piece of the candidate knowledge text, wherein the first query vector is an encoded vectorized representation of the first dialogue preceding text; and generating sub-code configured to cause the at least one processor to generate the preliminary dialogue response based on the first query vector and the feature vector of the first candidate knowledge set.

19. The apparatus according to claim 18, wherein the generating sub-code is configured to cause the at least one processor to:

add the first query vector and the feature vector of the first candidate knowledge set to obtain an input feature vector;

use the input feature vector as an input of a decoder, and call the decoder to obtain a first probability distribution based on the input feature vector and a target feature vector at a current time, the target feature vector representing a decoder state at the current time, wherein the first probability distribution is a weight of copying words in the first dialogue preceding text at the current time;

generate a third probability distribution based on the first probability distribution and a second probability distribution, wherein the second probability distribution is a probability distribution of a word list generated at the current time;

determine words outputted at the current time based on the third probability distribution; and determine words outputted by the decoder at each time as the preliminary dialogue response.

20. The apparatus according to claim 19, wherein the generating sub-code is configured to cause the at least one processor to obtain the first probability distribution by performing:

obtaining a query matrix of the decoder based on a first mapping matrix and the target feature vector;

obtaining a key matrix of the decoder based on a second mapping matrix and the input feature vector; and obtaining the first probability distribution based on the query matrix and the key matrix.

* * * * *